US 11,557,751 B2

(12) United States Patent
Bhowmik et al.

(10) Patent No.: US 11,557,751 B2
(45) Date of Patent: Jan. 17, 2023

(54) LITHIUM-ION CONDUCTOR

(71) Applicant: University of Dayton, Dayton, OH (US)

(72) Inventors: Rahul Bhowmik, Dayton, OH (US); Jitendra Kumar, Dayton, OH (US); Yuxing Wang, Dayton, OH (US)

(*) Notice: Subject to any disclaimer, the term of this patent is extended or adjusted under 35 U.S.C. 154(b) by 98 days.

(21) Appl. No.: 16/952,382

(22) Filed: Nov. 19, 2020

(65) Prior Publication Data

US 2021/0151735 A1    May 20, 2021

Related U.S. Application Data

(60) Provisional application No. 62/937,733, filed on Nov. 19, 2019.

(51) Int. Cl.
  *H01M 4/04*       (2006.01)
  *H01M 4/58*       (2010.01)
  *H01M 10/0562*    (2010.01)
  *H01M 4/38*       (2006.01)

(52) U.S. Cl.
  CPC ......... *H01M 4/0433* (2013.01); *H01M 4/043* (2013.01); *H01M 4/382* (2013.01); *H01M 4/582* (2013.01); *H01M 10/0562* (2013.01); *H01M 2300/008* (2013.01)

(58) Field of Classification Search
  CPC .............................................. H01M 2300/008
  See application file for complete search history.

(56) References Cited

PUBLICATIONS

Schneider et al. "Kristallstrukturen von Li6MgBr8 und Li2MgBr4" (1993).*
Muy et al. "High-throughput screening of solid-state li-ion conductors using lattice-dynamics descriptors" (2019).*
Calderon, Camilo E. et al. 'The AFLOW Standard for High-Throughput Materials Science Calculations'; Computational Materials Science; May 31, 2015.
Jackson, B.J.H. et al.; "Ionic conduction in pure and doped single-crystalline lithium iodide"; ScienceDirect; Journal of Physics and Chemistry of Solids, vol. 30, Issue 8, Aug. 1969.
Sendek, Austin D. et al.; "Holistic computational structure screening of more than 12 000 candidates for solid lithium-ion conductor materials"; RSC; Energy & Environmental Science; 2017.
Asano, Tetsuya et al.; "Solid Halide Electrolytes with High-Lithium-Ion Conductivity for Application in 4 V Class Bulk-Type All-Solid-State Batteries"; abstract; Advanced Materials; Sep. 14, 2018.
Asano, Tetsuya et al.; "Solid Halide Electrolytes with High-Lithium-Ion Conductivity for Application in 4 V Class Bulk-Type All-Solid-State Batteries"; Supporting Information; Advanced Materials; Sep. 14, 2018.
Perenthaler, E. et al.; "Structure investigations, atomic potentials, and phase transitions of the fast ionic conductor Ag3SI"; abstract; Solid State Ionics, vol. 5; Oct. 1981.
Tomita, Y. et al.; "Substitution effect of ionic conductivity in lithium ion conductor, LI3INBR6-xCLx"; abstract; ScienceDirect; Solid State Ionics, vol. 179, Issues 21-26; Sep. 15, 2008.

* cited by examiner

*Primary Examiner* — Austin Murata
(74) *Attorney, Agent, or Firm* — Thomas E. Lees, LLC

(57) ABSTRACT

A process of synthesizing a solid state lithium ion conductor includes mechanically milling at least two precursors so as to form crystalline $Li_6MgBr_8$. For instance, the mechanical milling can be carried out using a planetary mill. Moreover, in a practical application, the precursors include LiBr and $MgBr_2$.

20 Claims, 6 Drawing Sheets

LITHIUM-ION CONDUCTOR

CROSS REFERENCE TO RELATED APPLICATIONS

This application claims the benefit of U.S. Provisional Patent Application Ser. No. 62/937,733, filed Nov. 19, 2019, entitled "LITHIUM-ION CONDUCTOR", the disclosure of which is hereby incorporated by reference.

BACKGROUND

Various aspects of the present invention relate generally to lithium-ion conductors and specifically to halide-based lithium-ion conductors Solid state batteries are considered next generation batteries, and a key component of solid state battery systems is a good solid electrolyte (SE). Inorganic SE systems include oxides, sulfides, and halides. Sulfides and halides have low elastic modulus compared to oxides, so high densification (required for high effective ion transport) can be achieved simply by compression. In contrast, oxide system requires sintering at high temperature. Sulfides are heavily investigated currently due to the high ionic conductivity. However, sulfides could react with $H_2O$ (water) and form toxic $H_2S$ (Hydrogen sulfide). Halides are also hygroscopic but no hazardous materials is generated from the reaction. Therefore, halides are safer alternative to sulfides. In addition, halides have better electrochemical stability than sulfides, resulting in better interfacial properties with high voltage cathodes.

BRIEF SUMMARY

According to aspects of the present disclosure, a process of synthesizing a halide based SE includes mechanically milling at least two precursors so as to form crystalline $Li_6MgBr_8$ (LMB). For instance, the mechanical milling can be carried out using a planetary mill. Moreover, in a practical application, the precursors include LiBr and $MgBr_2$. In some embodiments, the conductor is formed without further treatment.

According to further aspects of the present disclosure, a solid-state battery comprises a lithium ion conductor comprised of a mechanochemically synthesized LMB.

According to yet further aspects of the present disclosure, a process of creating a lithium-ion cell comprises mechanically milling at least two precursors so as to form crystalline LMB in powder form, pressing the powder into a pellet, and attaching lithium foils both sides of LMB (symmetric cell). Same LMB can be sandwiched between a lithium foil and cathode forming full solid-state lithium cell).

DETAILED DESCRIPTION

Figure 1:
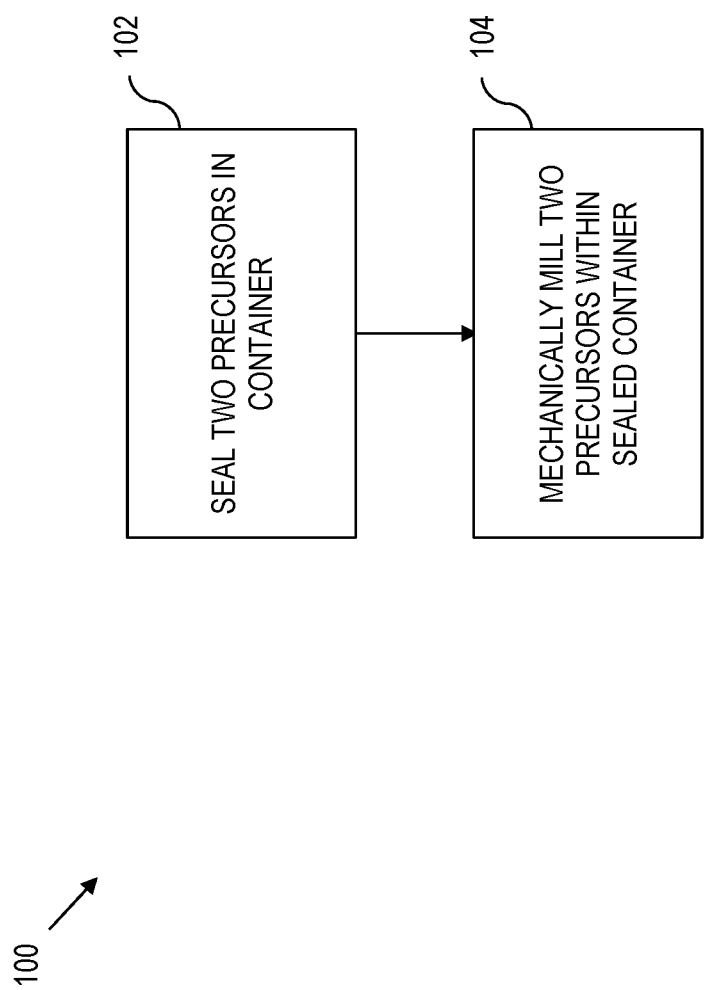
FIG. 1 is a flow chart illustrating a process for synthesizing $Li_6MgBr_8$ (LMB), according to various aspects of the present disclosure.

A mechanochemical synthesis route was used to create $Li_6MgBr_8$ (LMB). Precursors (LiBr and $MgBr_2$) were mechanically milled in a sealed container by a planetary mill, and in some instances the sealed container includes an argon atmosphere. Crystalline LMB was formed without further treatment. An X-ray powder diffraction (XRD) pattern of the milled sample showed that the sample includes no impurities. FIG. 1 is a flow chart illustrating a process 100 for creating LMB. At 102, the precursors (e.g., LiBr and $MgBr_2$) are sealed in a container. In some embodiments, the sealed container has an inert atmosphere such as argon. At 104, the two precursors are mechanically milled within the sealed container. For example, a planetary mill may be used to mechanically mill the precursors. In various embodiments, the mechanical milling is performed at room temperature. In some embodiments, the mechanical milling is performed at less than forty degrees Celsius. In many embodiments, the mechanical milling is performed between twenty and thirty degrees Celsius. In several embodiments, the mechanical milling is performed between twenty and twenty-five degrees Celsius.

Figure 2:
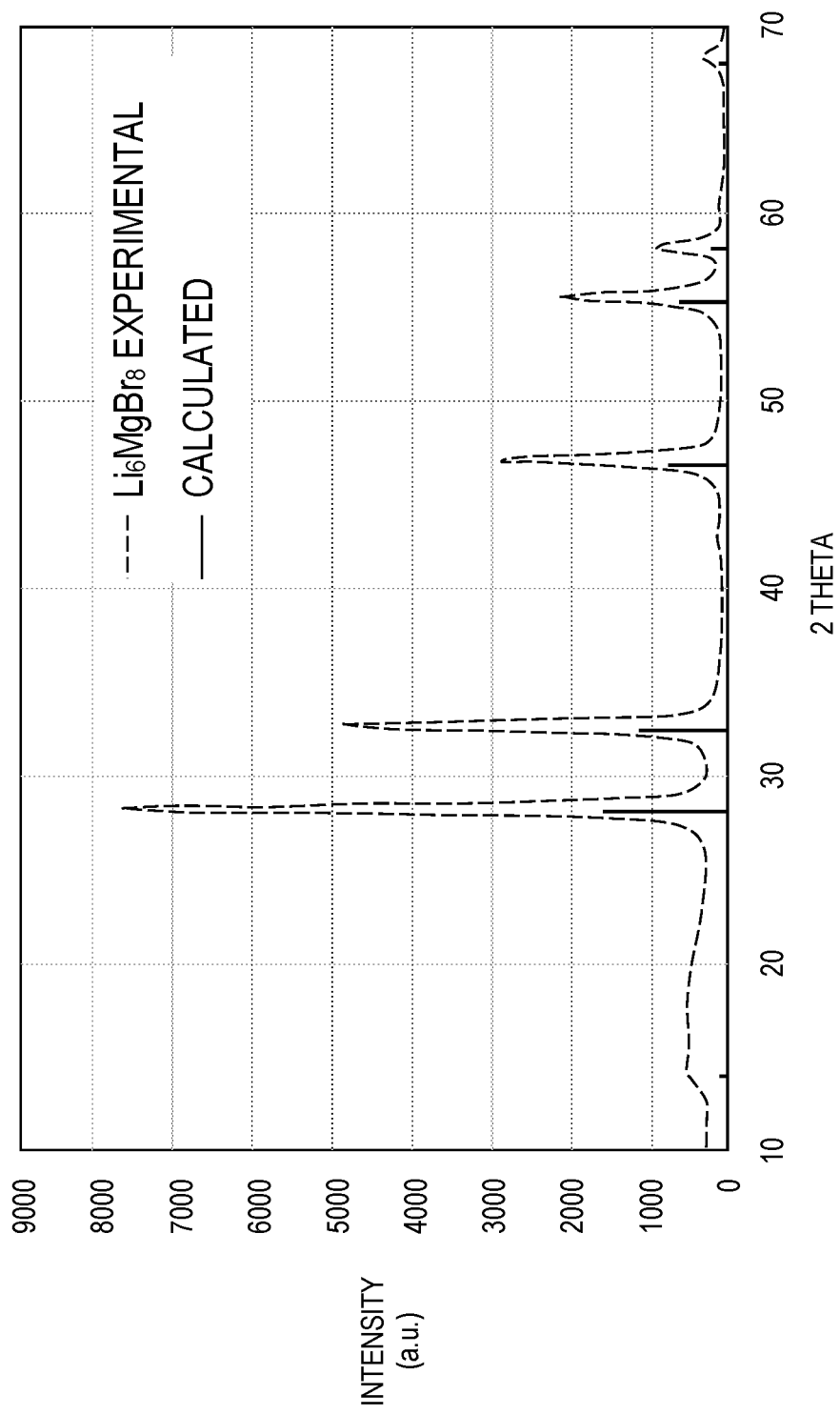
FIG. 2 is an X-Ray Powder Diffraction (XRD) pattern of $Li_6MgBr_8$ (LMB) synthesized by processes described herein.

FIG. 2 illustrates an XRD pattern of LMB synthesized by the mechanochemical process (100, FIG. 1), where the solid-line graph is a calculated XRD pattern (i.e., a desired result) and the dotted-line graph is an XRD pattern of the synthesized LMB (i.e., actual result).

Thus, the process (100, FIG. 1) described above synthesizes a LMB. Further, the LMB was synthesized in such a way to produce desired transport properties such that ionic conductivity of the LMB changes over temperature. The synthesized LMB powder was pressed into a pellet at 360 MPa. Li (Lithium) foils were attached to both sides of the pellet by pressing at 360 MPa. This process creates a Li/LMB/Li cell.

Figure 3A:
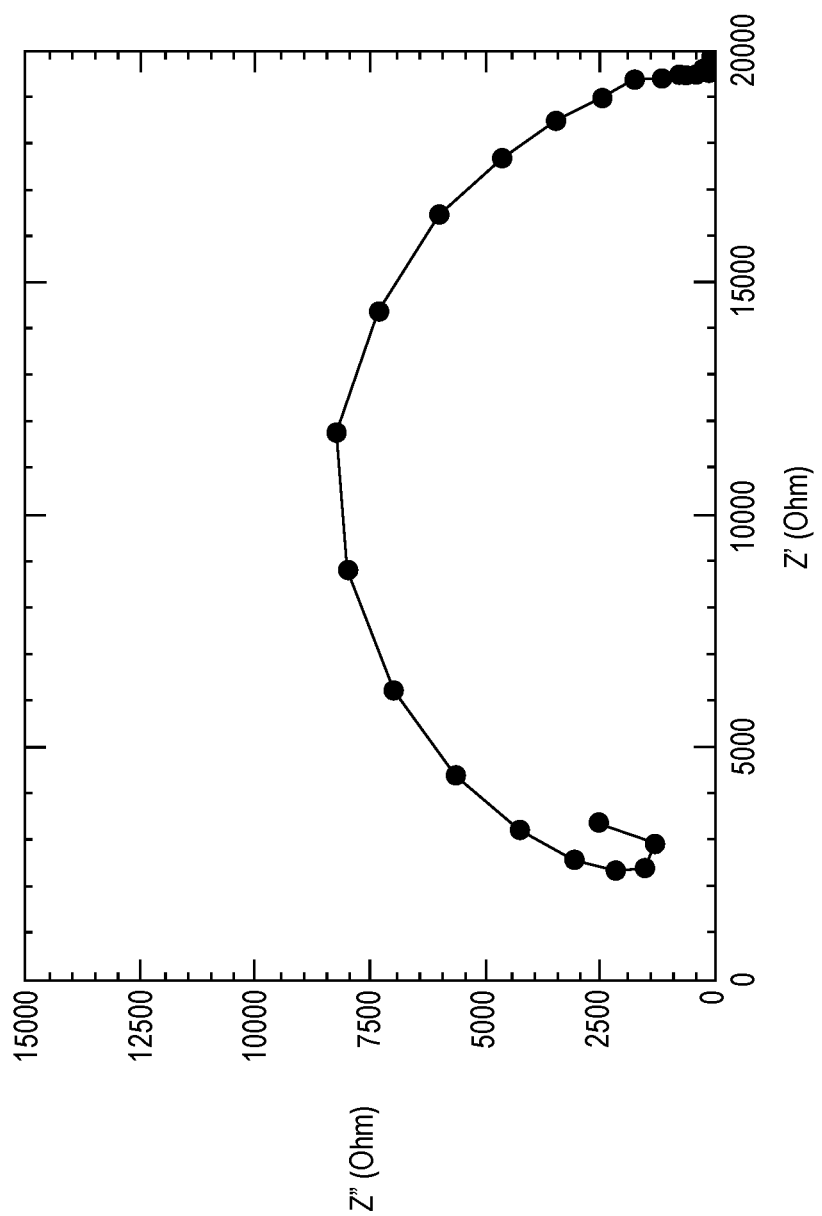
FIG. 3A is an impedance spectrum of a Li/LMB/Li symmetric cell at room temperature, according to various aspects of the present disclosure.
Figure 3B:
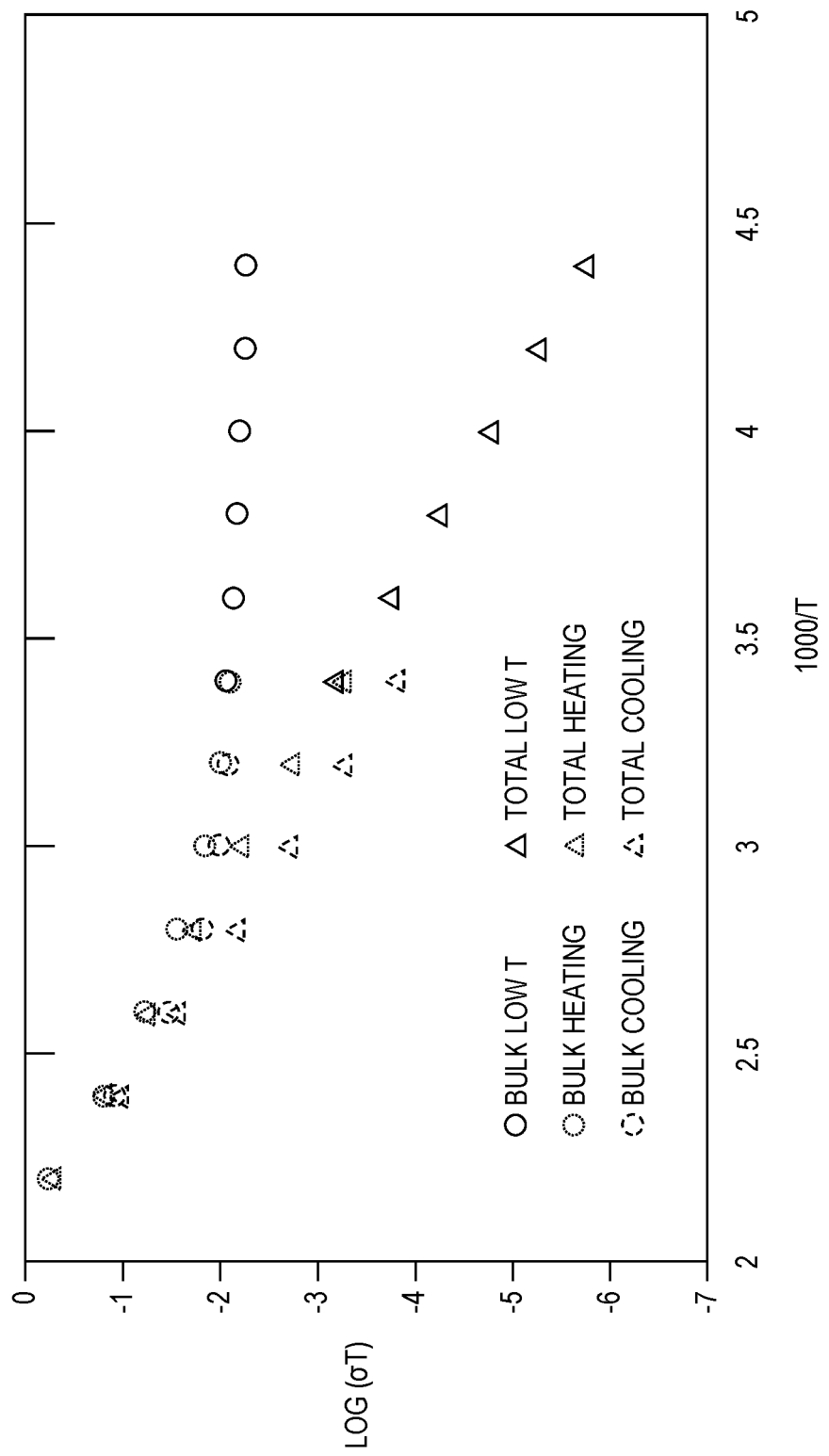
FIG. 3B is an Arrhenius plot of the Li/LMB/Li symmetric cell over a temperature range of −46° C. to 182° C., according to aspects of the present disclosure.

FIGS. 3A and 3B illustrate transport properties of the synthesized LMB. Specifically, FIG. 3A is an impedance spectrum of the Li/LMB/Li cell using the synthesized LMB at room temperature. Electrochemical impedance spectroscopy was applied to the cell over a temperature range of −46° C. to 182° C. A typical impedance of the Li/LMB/Li cell (FIG. 3A) has contributions from the bulk and grain boundaries. Impedance fitting showed that the semicircle does not start from zero on the real axis, so there is an additional semicircle at higher frequencies (beyond the measured range) that corresponds to bulk transport. This attribution also corresponds well with typical capacitance values of bulk and grain boundary processes. Therefore, the span of the observed semicircle yields the grain boundary resistance and the left intercept yields bulk resistance. The bulk conductivity of the Li/LMB/Li cell was about $2 \times 10^{-5}$ S/cm (Siemens per centimeter) and the total conductivity (includes grain boundary contribution) was $2 \times 10^{-6}$ S/cm at room temperature.

FIG. 3B is an Arrhenius plot of the Li/LMB/Li over a temperature range of −46° C. to 182° C., where σ is ionic conductivity and T is absolute temperature.

Using the room-temperature synthesis process above, the LMB was synthesized such that a bulk activation energy is at 0.05 electron volts (eV) at low temperatures to 0.34 eV at temperatures above room temperature. This bulk activation energy at low temperatures is something that has never been produced for solid-state lithium-ion conductors, which usually have a bulk activation energy of about 0.2 eV at low temperatures.

Figure 4:
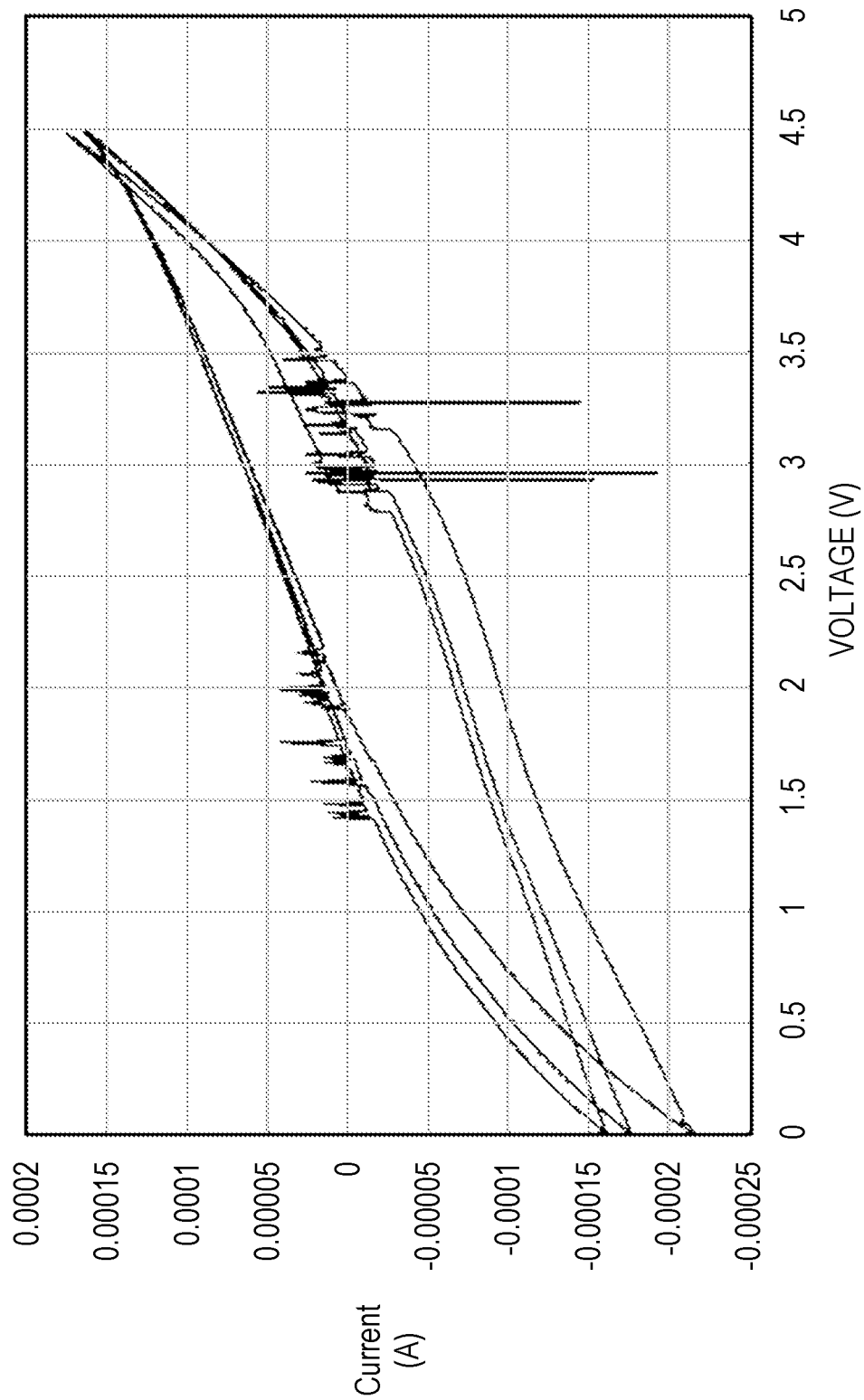
FIG. 4 is a cyclic voltammetry result of a cell with LMB SE and Li counter electrode at room temperature, according to various aspects of the present disclosure.

A CV (cyclic voltammetry) plot of the synthesized LMB is shown in FIG. 4. Three cycles of scan were performed. There was no obvious oxidation/reduction peak observed from 0 to 4.5 V, indicating good electrochemical stability. The envelope of the forward and reverse scan is due to capacitive effect. FIG. 4 shows a CV result of a cell with LMB electrode and Li counter electrode at room temperature. The LMB electrode contains 5 wt % of electron conductive carbon. The scan rate is 5 mV/s.

Figure 5:
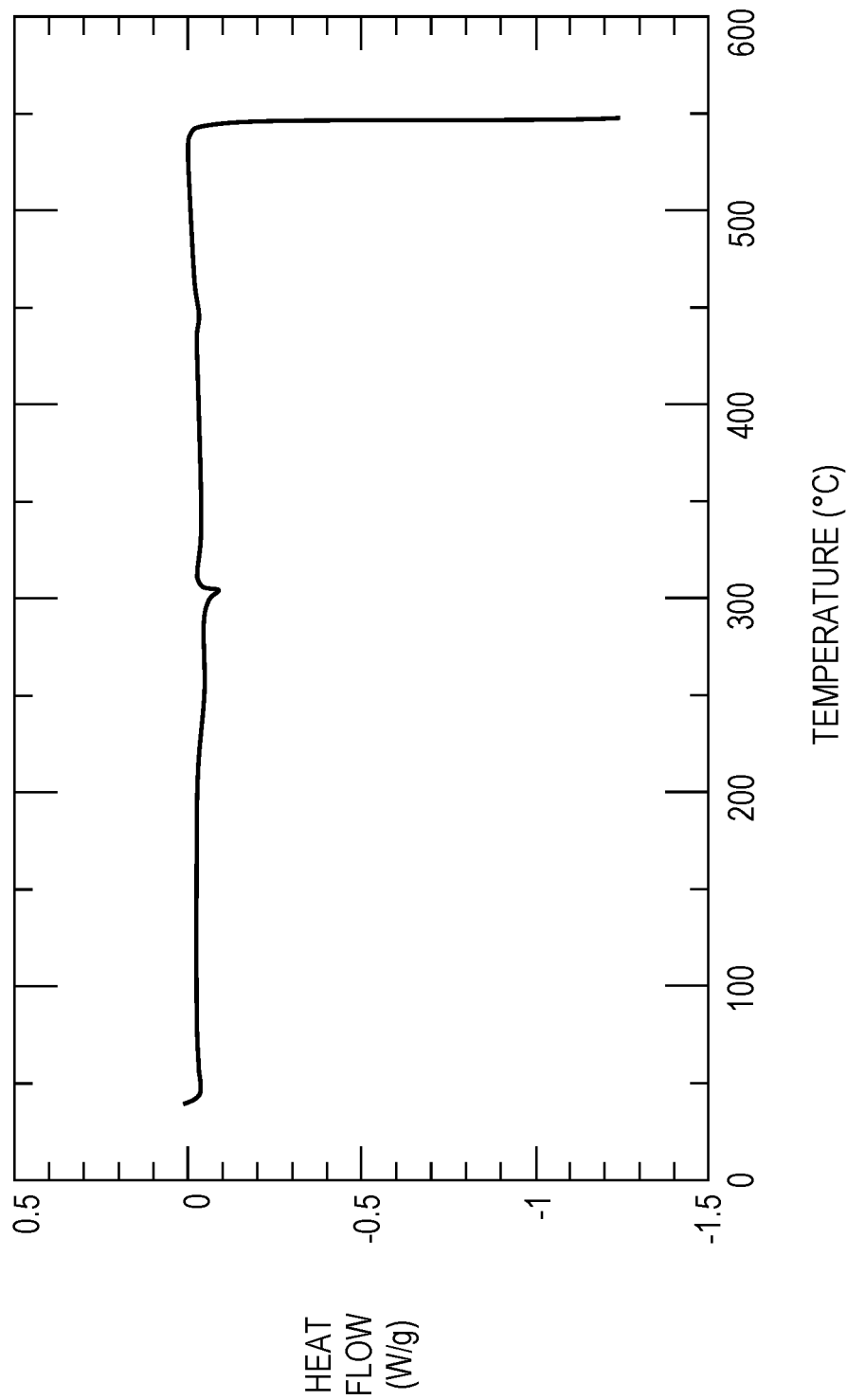
FIG. 5 a differential scanning calorimetry result of LMB, according to various aspects of the present disclosure.

Further, FIG. 5 is a differential scanning calorimetry (DSC) result of LMB that is in powder form and sealed in an aluminum pan. Thus, the LMB synthesized from the process described herein has no obvious thermal event until the melting at 550° C., suggesting that the LMB phase was stable until melting. The heat flow associated with the peak at around 300° C. is too small to be any phase transition event, so it may just be an instrumental effect.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A process of synthesizing a lithium ion conductor, comprising:
   mechanically milling at least two precursors so as to form crystalline $Li_6MgBr_8$ (LMB) solid electrolyte.

2. The process of claim 1, wherein mechanical milling at least two precursors is carried out using a planetary mill.

3. The process of claim 1, wherein mechanically milling at least two precursors comprises:
   mechanically milling a first precursor comprising LiBr and a second precursor comprising $MgBr_2$.

4. The process of claim 1, wherein mechanically milling at least two precursors occurs at a temperature that is below 40 degrees Celsius.

5. The process of claim 4, wherein mechanically milling at least two precursors occurs at room temperature.

6. The process of claim 1, wherein mechanically milling at least two precursors occurs inside an argon-filled container.

7. The process of claim 1, wherein mechanically milling at least two precursors occurs inside a sealed container.

8. A process of synthesizing a lithium ion conductor, consisting of:
   mechanically milling at least two precursors so as to form crystalline $Li_6MgBr_8$.

9. The process of claim 8, wherein mechanical milling at least two precursors is carried out using a planetary mill.

10. The process of claim 8, wherein mechanically milling at least two precursors comprises:
    mechanically milling a first precursor comprising LiBr and a second precursor comprising $MgBr_2$.

11. The process of claim 8, wherein mechanically milling at least two precursors occurs at a temperature that is below 40 degrees Celsius.

12. The process of claim 11, wherein mechanically milling at least two precursors occurs at room temperature.

13. The process of claim 8, wherein mechanically milling at least two precursors occurs inside an argon-filled container.

14. A process of creating a lithium-ion cell, comprising:
    mechanically milling at least two precursors so as to form crystalline $Li_6MgBr_8$ in powder form;
    pressing the powder into a pellet; and
    attaching lithium foils to the pellet.

15. The process of claim 14, wherein mechanical milling at least two precursors is carried out using a planetary mill.

16. The process of claim 14, wherein mechanically milling at least two precursors comprises:
    mechanically milling a first precursor comprising LiBr and a second precursor comprising $MgBr_2$.

17. The process of claim 14, wherein pressing the powder into a pellet comprises compressing the pellet at 360 MPa or less.

18. The process of claim 14, wherein pressing the powder into a pellet comprises compressing the pellet at 360 MPa or greater.

19. The process of claim 14, wherein attaching lithium foils comprises compressing the pellet at 360 MPa or less.

20. The process of claim 14, wherein attaching lithium foils comprises compressing the pellet at 360 MPa or greater.

* * * * *